United States Patent
Gaetje

(10) Patent No.: US 11,683,388 B2
(45) Date of Patent: Jun. 20, 2023

(54) LOCALIZED WEATHER APPLICATION

(71) Applicant: Rovi Guides, Inc., San Jose, CA (US)

(72) Inventor: Clay Gaetje, Fullerton, CA (US)

(73) Assignee: Rovi Guides, Inc., San Jose, CA (US)

( * ) Notice: Subject to any disclaimer, the term of this patent is extended or adjusted under 35 U.S.C. 154(b) by 143 days.

(21) Appl. No.: 16/950,416

(22) Filed: Nov. 17, 2020

(65) Prior Publication Data

US 2022/0159085 A1 May 19, 2022

(51) Int. Cl.
*G06F 15/16* (2006.01)
*H04L 67/52* (2022.01)
*H04W 4/029* (2018.01)
*G01W 1/10* (2006.01)

(52) U.S. Cl.
CPC ............ *H04L 67/52* (2022.05); *G01W 1/10* (2013.01); *H04W 4/029* (2018.02)

(58) Field of Classification Search
CPC .......... H04L 67/52; H04W 4/029; G01W 1/10
See application file for complete search history.

(56) References Cited

U.S. PATENT DOCUMENTS

2017/0276834 A1* 9/2017 Stenneth ............. G01W 1/10
2018/0038705 A1* 2/2018 Bills ................ G01C 21/3484

OTHER PUBLICATIONS

PCT International Search Report for International Application No. PCT/US2020/066076, dated Oct. 4, 2021 (14 pages).

* cited by examiner

*Primary Examiner* — Normin Abedin
(74) *Attorney, Agent, or Firm* — Haley Guiliano LLP

(57) ABSTRACT

Systems and methods are provided herein for supplying localized weather information to a user. This may be accomplished by a system receiving a request to generate a weather report for a location. The system may identify weather information sources within a threshold distance of the location, wherein one or more of the weather information sources is a mobile weather information source. The device may generate a weather report for the location based on the weather information received from the weather information sources.

16 Claims, 10 Drawing Sheets

200

| Identifier | Within Threshold? | Temperature | Precipitation | Brightness |
|---|---|---|---|---|
| 112A | Yes | 78 | 0% | 5,050 |
| 112B | Yes | 89 | 0% | 6,123 |
| 114A | Yes | 76 | N/A | N/A |
| 114B | Yes | 76 | 0% | 5,043 |
| 114C | Yes | 77 | 50% | 5,040 |
| 116A | No | 76 | 0% | 5,035 |
| 116B | No | 77 | N/A | N/A |
| 116C | No | 78 | 0% | N/A |
| 116D | No | 75 | 0% | 5,044 |
| 116E | No | 79 | 0% | N/A |
| 118 | No | 76 | 0% | 5,036 |

FIG. 2

LOCALIZED WEATHER APPLICATION

BACKGROUND

The present disclosure relates to computer-implemented techniques for determining weather information, in particular to techniques for supplying localized weather information to a user.

SUMMARY

Electronic devices (e.g., smartphones, laptops, tablets, personal computers, etc.) provide various types of information to users throughout the day. One type of information that many users have grown to rely on is information related to weather conditions. Information related to weather conditions can include temperature, humidity, cloud cover, precipitation, wind speed, barometric pressure, and similar such information. This information is particularly important for users when planning out their daily lives. For example, when temperatures are cold, a user may decide to incorporate a jacket into their wardrobe, and if temperatures are hot, a user may decide to go to the pool. Current weather applications rely on data received from weather collection stations to generate information related to weather conditions. However, there are many situations where current weather applications are wholly inadequate. For example, due to the limited number of weather collection stations, current weather applications lack granularity, and most weather applications are only able to provide weather conditions down to a city level. This is problematic as many cities, such as Los Angeles, span very large areas where weather conditions can vary drastically in different parts of the cities. In some situations, there may be thunderstorms on one side of the city and sunny weather conditions on the other side of the city twenty miles away. This results in users receiving inaccurate information, causing disruptions throughout their day. In view of these deficiencies, there exists a need for improved systems and methods for supplying localized weather information to a user.

Accordingly, techniques are disclosed herein for improved systems and methods for supplying localized weather information to a user. Various embodiments disclosed herein provide for a weather application to determine a location of a user associated with a first device. After determining the location of the user using the first device, the weather application identifies vehicles that are within a threshold distance of the user's location. For example, the weather application may identify all vehicles that are within five miles of the location of the user. To identify these vehicles, the weather application may access a database containing locations of vehicles and select vehicles that are within a threshold distance of the user's location. After the weather application determines the vehicles that are close to the user, the weather application then receives weather information from said vehicles. The weather information can correspond to any information used to generate a weather report. For example, most vehicles comprise a thermometer, photoelectric sensor, and/or a precipitation sensor. These instruments can be used to generate weather information (e.g., the thermometer can be used to indicate the current temperature). The weather application receives the weather information generated by the vehicles and uses this information to generate a weather report for the user. Utilizing vehicles instead of solely relying on weather stations provides improved systems and methods that result in a weather report for users that is more accurate and more granular.

In some embodiments, when determining vehicles that are within a threshold distance of the user, the weather application dynamically updates the threshold distance based on the number of vehicles within the threshold distance. For example, the weather application may require weather information from at least five vehicles within the threshold distance in order to generate a weather report. If the starting threshold distance is one mile from the user and the weather application determines that there are only three vehicles within the one-mile threshold distance, then the weather application will incrementally update the threshold distance until the minimum number of vehicles are within the threshold distance. For example, when the weather application increases the threshold distance to two miles, the weather application may determine that eight vehicles are located within the threshold distance. The weather application will use the new threshold distance of two miles to generate the weather report because the two-mile threshold distance comprises the necessary number of vehicles. After determining vehicles that are within the threshold distance of the user, the weather application may receive a plurality of data points wherein each data point is associated with one of the vehicles that are within the threshold distance. The plurality of data points corresponds to the weather information collected by the one or more instruments onboard the vehicles that are within the threshold distance. For example, a first vehicle within the threshold distance may send a first data point that indicates the temperature determined by the thermometer onboard the first vehicle. In other examples, the first vehicle may send additional data points where the data points correspond to different weather information. For example, the other data points may correspond to brightness determined by a photoelectric sensor onboard the first vehicle and/or precipitation determined by one or more sensors onboard the first vehicle.

In some embodiments, the weather application receives the plurality of data points from each of the vehicles that are within the threshold distance of the user. For example, each vehicle within the threshold distance of the user submits data points corresponding to the temperature recorded by its onboard thermometers to a database. The vehicles may submit data points when requested or may automatically submit data points periodically (e.g., every 30 seconds). The data points may be accompanied by location data to ensure the vehicles that submitted the data points, are still within the threshold distance of the user. The weather application uses the data points submitted by the vehicles that are within the threshold distance of the user and generates the weather report. When generating the weather report the weather application may use a weighted average where each received data point is weighted depending on a number of factors. For example, data points received from vehicles that are closer to the user will be weighted higher than data points received from vehicles that are farther away from the user. In another example, data points associated with moving vehicles may be weighted differently than data points associated with stationary vehicles. Data points received from newer vehicles with newer onboard instruments may be weighted differently than data points received from older vehicles.

In some embodiments, the weather application processes the received data points to generate a weather report for the user. For example, if ten vehicles within the threshold distance of the user each submit a data point indicating the temperature recorded by their respective onboard thermometers, the weather application can take the average of the ten data points to determine a current local temperature that is included in the weather report for the user. Using data processing methods, the weather application can determine if any of the received data points should be ignored when generating the weather report. For example, if nine data points indicate temperatures that are within five degrees of each other, but a tenth data point indicates a temperature that is fifteen degrees different from any of the other nine data points, then the weather application will identify the tenth data point as an abnormality. This abnormality may be the result of the vehicle being exposed to some variant (e.g., shade, wind, excessive sunlight, etc.), faulty instruments onboard the vehicle, or some other irregularity. In some embodiments, the weather application will ignore data points that are categorized as abnormal when generating the weather report for the user. In some embodiments, the weather application can utilize weather information collected by other sources (e.g., weather collection stations, home weather stations, etc.) to further refine the accuracy of the generated weather reports.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which:

FIG. 2 shows a diagram of an illustrative table for providing localized weather information, in accordance with some embodiments of the disclosure;

DETAILED DESCRIPTION

Figure 1:
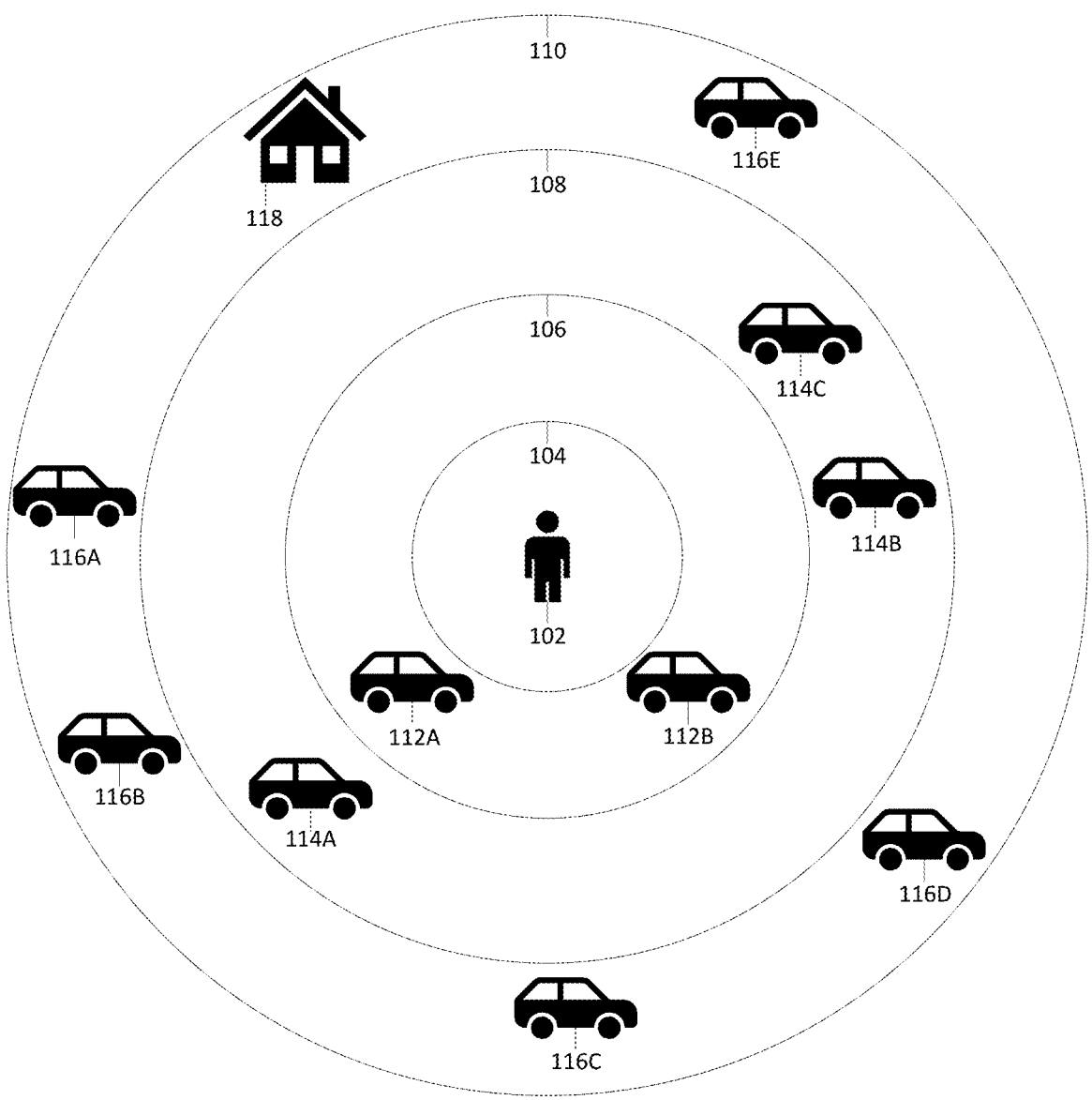
FIG. 1 shows an illustrative diagram of a system for providing localized weather information, in accordance with some embodiments of the disclosure.

FIG. 1 shows an illustrative diagram 100 of a system for providing localized weather information, in accordance with some embodiments of the disclosure. System 100 includes a user 102 with a user equipment device. System 100 also includes weather information sources 112A-B, 114A-C, 116A-E, and 118. Weather information sources can be any source that can supply information related to weather conditions (e.g., temperatures, humidity, sun conditions, cloud cover, precipitation, wind speed, barometric pressure, and similar such information). In some embodiments, weather information sources 112A-B, 114A-C, 116A-E, and 118 comprise one or more instruments for collection of weather information. Weather information sources 112A-B, 114A-C, and 116A-E are mobile weather information sources such as vehicles with instruments for collecting weather information. For example, most vehicles comprise a thermometer, photoelectric sensor, and/or a precipitation sensor. These instruments can be used to generate weather information (e.g., the thermometer can be used to indicate the current temperature). Weather information source 118 is a stationary weather information source such as weather collection station or a home weather station.

In some embodiments, a user 102 with a user equipment device requests a local weather report by launching a weather application on the user equipment device. The weather application determines the location of the user 102 by using a global positioning system. In some embodiments, the weather application determines the location of the user 102 using cell tower data, Wi-Fi hotspot information, user profile information, or similar such information. After determining the location of the user equipment device, the weather application identifies weather information sources that are within a threshold distance of the user's location. To identify the relevant weather information sources, the weather application can access a database containing locations of weather information sources and select weather information sources that are within a threshold distance of the user's location. In some embodiments, the desired location for the weather report is the destination of the user rather than the current location of the user. The destination of the user can be inputted by the user, determined using a calendar, determined from a mapping or navigation application and/or determined using some other method.

In some embodiments, the weather application selects a first area 104 as the threshold distance and identifies all weather information sources that are within the first area 104. In some embodiments, the weather application determines the first area 104 based on predetermined criteria (e.g., circle with a radius of one mile from the determined location). Although circles are shown, any shape, pattern, and/or zone can be used for the threshold distance. In this embodiment, there are no weather information sources in the first area 104, so the weather application determines that it must change its threshold distance to a second area 106. In some embodiments, the second area 106 covers a larger area than the first area 104. The second area 106 can overlap with the first area 104 or, as in this embodiment, can encompass the entire first area 104. In some embodiments, the first area 104 is a first annulus and the second area 106 is second non-overlapping annulus. The weather application can determine the second area 106 to be used as the threshold distance based on predetermined zones, incremental increases, or similar such parameters.

In some embodiments, the weather application selects the second area 106 as the threshold distance and identifies all weather information sources that are within the second area 106. As shown, there are two weather information sources 112A and 112B in the second area 106. The weather application can determine the approximate location of weather information sources using global positioning systems, cell tower data, Wi-Fi hotspot information, user profile information, or similar such information. The weather application receives weather information from the two weather information sources 112A and 112B in the second area 106. In some embodiments, the weather information sources 112A and 112B comprise instruments to generate weather information. For example, weather information sources 112A and 112B comprise thermometers and submit temperature data to the weather application. The weather application receives the temperature data and generates a weather report for the user 102.

In some embodiments, the weather application requires weather information from a minimum number of weather information sources in order to generate a weather report. For example, if the weather application requires a minimum of five weather information sources, the weather application determines that the second area 106 does not include the minimum number of weather information sources. In some embodiments, the weather application selects a third area 108 and identifies all weather information sources that are within the third area 108. As shown, there are five weather information sources 112A, 112B, 114A, 114B, and 114C in the third area 108, satisfying the minimum number of weather information sources required by the weather application. In some embodiments, the weather information sources 112A, 112B, 114A, 114B, and 114C in the third area 108 comprise thermometers and submit temperature data to the weather application. The weather application receives the temperature data and generates a weather report for the user 102. In some embodiments, the weather application averages all the temperature data received from the weather information sources to generate the weather report. In some embodiments, the temperature data is weighted corresponding to the proximity of the weather information source to the user 102. For example, the temperature data submitted by weather information sources 112A and 112B is weighted higher than the temperature data submitted by weather information sources 114A, 114B, and 114C because weather information sources 112A and 112B are closer to the user than weather information sources 114A, 114B, and 114C.

In some embodiments, the weather application requires a minimum of ten weather information sources, and the weather application determines that the third area 108 does not include the minimum number of weather information sources. In some embodiments, the weather application selects a fourth area 110 and identifies all weather information sources that are within the fourth area 110. As shown, there are eleven weather information sources 112A-B, 114A-C, 116A-E, and 118 in the fourth area 110, satisfying the minimum number of weather information sources required by the weather application. In some embodiments, the weather information sources 112A-B, 114A-C, 116A-E and 118 in the fourth area 110 comprise thermometers and submit temperature data to the weather application. The weather application receives the temperature data and generates a weather report for the user 102. In some embodiments, weather information source 118 is a weather collection station or a home weather station.

In some embodiments, the weather application weights weather information (e.g., temperature data) received from different sources differently. For example, temperature data submitted by weather information source 118 may be weighted differently than temperature data submitted by weather information sources 116A-E. In some embodiments, temperature data submitted by a newer weather information source is weighted differently than temperature data submitted by an older weather information source. In some embodiments, weather information sources have confidence values associated with their submitted weather information. The confidence values may be generated by the weather information sources that generate the temperature data and/or the weather application. In some embodiments, the confidence values are based on the accuracy of previously submitted weather information.

FIG. 2 shows a diagram of an illustrative table 200 for providing localized weather information, in accordance with some embodiments of the disclosure. In particular, table 200 can illustrate a table of entries contained in a database accessible by the user equipment device of user 102. In some embodiments, table 200 reflects system 100 from FIG. 1.

Table 200 comprises eleven entries corresponding to different identifiers (112A-B, 114A-C, 116A-E, and 118) where each identifier is associated with a different weather information source. For each identifier, table 200 indicates whether the identifier is within the threshold distance of the user equipment device of user 102. In the shown embodiment, the weather application selects a threshold distance (e.g., third area 108) and identifies all weather information sources that are within the threshold distance. Table 200 indicates that weather information sources 112A, 112B, 114A, 114B, and 114C are all within the threshold distance. The threshold distance can be determined and/or updated using the techniques described herein. For example, if the weather application requires weather information from a minimum of ten weather information sources, the weather application can determine that the threshold distance needs to be updated to satisfy the condition. In an embodiment, table 200 is changed to reflect an updated threshold distance by indicating that identifiers 116A, 116B, 116C, 116D, 116E and 118 are within the threshold distance.

For each identifier, table 200 indicates one or more categories (Temperature, Precipitation, and Brightness) of data points associated with the identifier. The categories correspond to weather information collected by one or more instruments onboard a weather information source. For example, the temperature measurement may be determined by a thermometer onboard a weather information source. In some embodiments, the precipitation measurement may be determined by one or more sensors onboard the weather information source (e.g., vehicles with rain-sensing windshield wipers). In some embodiments, the brightness measurement may be determined by one or more photoelectric sensors onboard the weather information source. Table 200 displays that weather information source 112A submitted a temperature of 78 degrees Fahrenheit, precipitation at 0%, and a brightness of 5,050 lux. Table 200 is just one embodiment; any variation of organization, categories, measurements, and units can be used without departing from the systems and methods described herein.

The weather application processes the data points from the weather information sources within the threshold distance to generate a weather report for the user. As shown, five weather information sources 112A, 112B, 114A, 114B, and 114C are all within the threshold distance. In some embodiments, the weather application generates a weather report by averaging all the data points received from the weather information sources within the threshold distance. For example, to determine the local temperature, the weather application averages the five temperature data points from the weather information sources within the threshold distance. Any number of data processing techniques may be used to process data received from the weather information sources. In some embodiments, data received from the weather information sources may go through smoothing operations (e.g., moving averages, splines, etc.) to correct for variance.

Using data processing methods, the weather application may determine that some of the received data points should be ignored when generating the weather report. For example, the five temperature data points received from the weather information sources within the threshold distance are 78, 89, 76, 76, and 77. Four of the temperature data points from 112A, 114A, 114B, and 114C are all within two degrees of each other, while the fifth temperature data point from 112B is more than ten degrees different than any of the other data points. In an embodiment, the weather application identifies the data point received from 112B as an abnormality. This abnormality may be the result of weather information source 112B being exposed to some variant (e.g., excessive sunlight), faulty instruments onboard weather information source 112B, or some other irregularity. In some embodiments, the weather application ignores data points categorized as abnormal when generating weather reports. In another example, the weather information sources within the threshold distance submit four precipitation data points. Three of the data points from 112A, 112B, and 114B indicate a 0% precipitation and one data point from 114C indicates a 50% precipitation. In an embodiment, the weather application identifies the data point received from 114C as an abnormality. This abnormality may be the result of weather information source 114C being exposed to some variant (e.g., weather information source 114C going through a puddle, or having the windshield washer turned on, etc.), faulty instruments onboard weather information source 114C, or some other irregularity. In some embodiments, the weather application ignores data points categorized as abnormal when generating weather reports.

In some embodiments, when a weather information source is associated with an abnormal data point, the weather application will flag the weather information source that submitted the abnormal data point. For example, weather information source 112B submitted the temperature data point of 89 degrees, which was determined to be abnormal. Weather information source 112B also recorded precipitation and brightness data points. When the weather application averages the precipitation and/or brightness data points received from the weather information sources within the threshold distance to generate a weather report, the weather application weights the precipitation and brightness data points received from weather information source 112B lower because it submitted a temperature data point that was determined to be abnormal. In some embodiments, all data points received from weather information source 112B will be determined to be abnormal. In some embodiments, a flagged weather information source may have to submit a certain number of non-abnormal data points in order to not be flagged as abnormal. In some embodiments, once a flagged information source is flagged as abnormal, the weather application sends a message to check and/or repair the weather information source. In some embodiments, if a group of weather information sources share an attribute (e.g., the same model of vehicle) and they consistently submit data points in a similar abnormal manner (e.g., all submit abnormally high temperatures), the weather application flags other weather information sources that share that attribute without having to receive a first data point from the other weather information sources. In some embodiments, once a group of weather information sources that share an attribute (e.g., group of vehicles of the same model) are flagged, the weather application sends a message to indicate a possible manufacturing defect. In some embodiments, a weather information source that is flagged as abnormal cannot be used to satisfy minimum conditions required to generate a weather report. For example, if the weather application requires temperature data points from a minimum of five weather information sources and one of the five information sources is flagged as abnormal, the weather application will determine that the minimum conditions to generate the weather report are not met. In some embodiments, the weather application updates the threshold distance to include at least five weather information sources that are not flagged as abnormal.

In some embodiments, some data points are not available as indicated by "N/A," meaning "not applicable." For example, weather information source 114A's precipitation and brightness data points are N/A. This may be because weather information source 114A does not have instruments to measure these values or the instruments are damaged. In some embodiments, data points are indicated as N/A when the data points are stale. For example, the weather application can require data points to expire after a certain amount of time (e.g., one minute, five minutes, etc.) to ensure accurate data. The weather information sources may submit data points when requested or may automatically submit data points periodically (e.g., every 30 seconds). In some embodiments, a weather information source submits location data along with weather information. For example, if a mobile weather information source is a vehicle on the freeway, it may be in the threshold distance one minute and then be miles away in the next few minutes. In some embodiments, certain requirements (e.g., location data accompanying data points, data point refresh rate, etc.) are applied to all weather information sources, types of weather information sources, and/or to certain weather information sources. For example, stationary weather information sources may not be required to refresh their submitted weather information as often as mobile weather information sources. These requirements can be user selected, pre-programmed, and/or learned over time using a machine-learning algorithm.

In some embodiments, to generate the weather report, the weather application weights the data points in table 200 according to one or more factors. In some embodiments, a factor is the proximity of the weather information source to the location associated with the weather report. For example, the data submitted by weather information sources 112A and 112B may be weighted higher than the data submitted by weather information sources 114A, 114B, and 114C if weather information sources 112A and 112B are closer to the location associated with the weather report than weather information sources 114A, 114B, and 114C. In some embodiments, a factor affecting the weighting of data points is the type of weather information source. For example, data submitted by stationary weather information source 118 may be weighted differently than data submitted by a mobile weather information source 116A. In some embodiments, data submitted by newer weather information sources may be weighted differently than temperature data submitted by older weather information sources. In some embodiments, weather information sources have confidence values associated with their submitted weather information. The confidence values may be generated by the weather information sources that generate the weather information and/or the weather application. In some embodiments, the confidence values are based on the accuracy of previously submitted weather information.

Figure 3A:
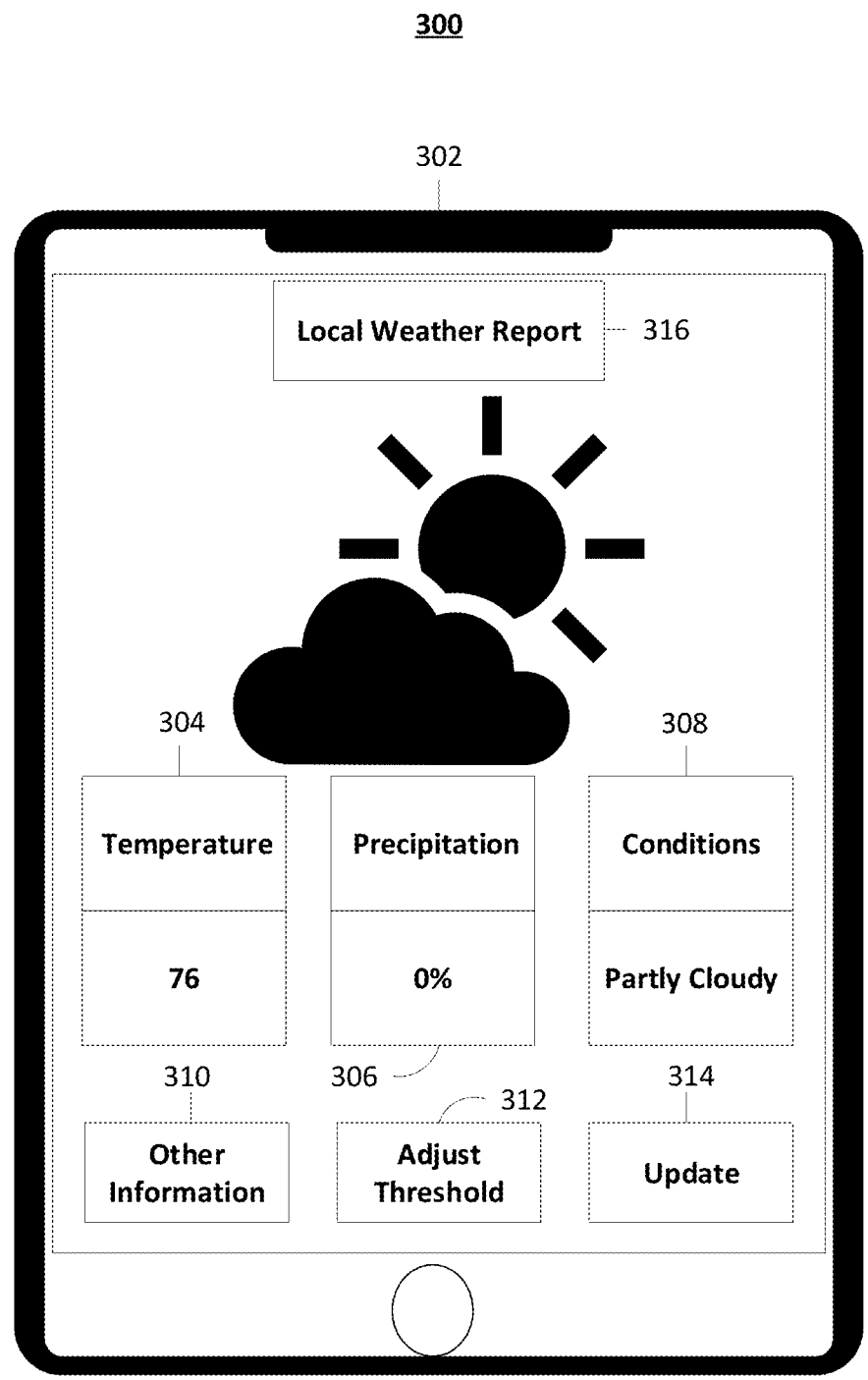
FIGS. 3A and 3B show illustrative diagrams of user devices generating weather reports, in accordance with some embodiments of the disclosure.

FIG. 3A shows an illustrative diagram 300 of a user equipment device 302 generating a weather report, in accordance with some embodiments of the disclosure. Although a smartphone is used in this example, a user equipment device 302 may be any device or devices capable of displaying a weather report, such as televisions, laptops, tablets, smartphones, or similar such devices. In some embodiments, a user launches the weather application, and the weather application displays the weather report corresponding to the user's location 316. The user's location may be determined using a global positioning system, cell tower data, Wi-Fi hotspot information, user profile information, or similar such information. The weather report displays the local temperature 304, precipitation 306, and conditions 308. These values may be generated using the information in table 200 from FIG. 2 and may reflect system 100 from FIG. 1.

In some embodiments, the user equipment device 302 displays an "Other Information" option 310. A user can select the other information option 310 to view other weather-related information (e.g., windspeed, humidity, barometric pressure, and similar such information). In some embodiments, the user equipment device 302 displays an "Adjust Threshold" option 312. The user can select the adjust threshold option 312 to change the threshold distance used to generate the weather report. In some embodiments, the user can select the adjust threshold option 312 to change the location being used to generate the weather report. For example, the user can change from having a weather report based on the user's location to a weather report based on a different location. In some embodiments, the user equipment device 302 displays an "Update" option 314. The user can select the update option 314 to cause the weather application to generate a fresh weather report. In some embodiments, the weather report is updated periodically (e.g., every 30 seconds) without the user's input.

Figure 3B:
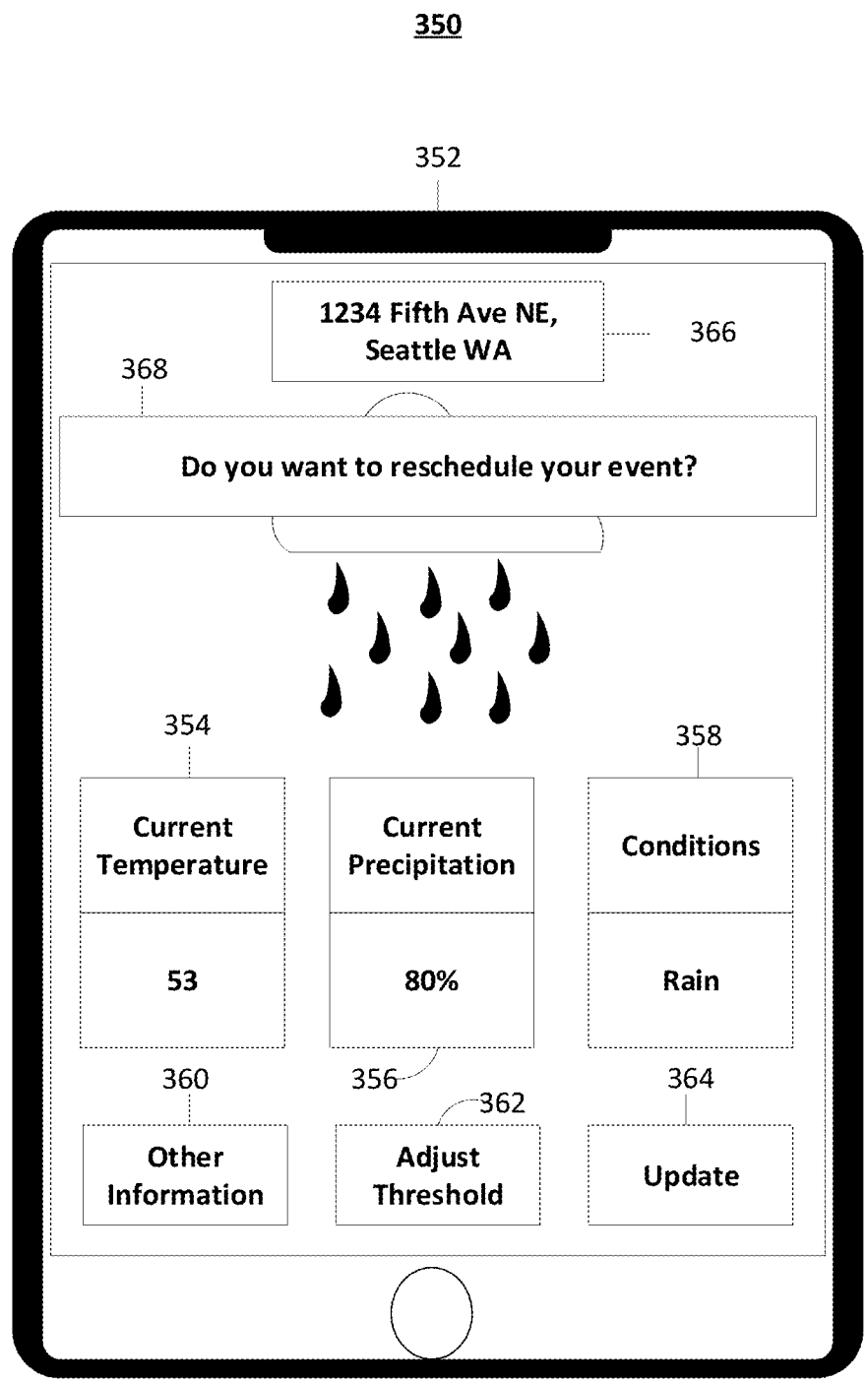

FIG. 3B shows an illustrative diagram 350 of a user equipment device 352 generating a weather report, in accordance with some embodiments of the disclosure. In some embodiments, a user launches the weather application on the user equipment device 352 and types in a location 366, and the weather application displays the weather report corresponding to the location 366. The weather report displays the temperature 354, precipitation 356, and conditions 358 associated with the location 366. In some embodiments, the weather application makes recommendations (e.g., activities, clothing, etc.) based on the weather report. For example, when it is cold the weather application may recommend that the user "Bring a sweater." In another example, when it is rainy the weather application may recommend to "Leave the baseball mitt at home and bring an umbrella." In some embodiments, the weather application generates the weather report for a location and makes recommendations based on event and/or attraction information associated with the location, wherein the event and/or attraction information is received from a database. For example, the weather application recommends going to a baseball game based on the generated weather report indicating sunny weather conditions and event information indicating that a baseball game is occurring near the location 366.

In some embodiments, the user equipment device 352 has access to a database comprising a calendar with scheduled events associated with the user, wherein one or more of the scheduled events is associated with a location. In some embodiments, the user equipment device 352 can generate a notification 368 related to the weather report. For example, if the user has a picnic scheduled in their calendar at a location 366 and the weather application determines that the weather conditions are not suitable for the scheduled activity, the notification 368 will ask if the user wants to reschedule. In some embodiments, the weather application generates the notification 368 at a predetermined time (e.g., 30 minutes) before the scheduled event. In some embodiments, the weather application generates the notification 368 when the weather application determines that weather conditions are changing or have changed. For example, if the weather application determines that weather conditions have changed from sunny to rainy at a location 366 near the time of a scheduled event (e.g., picnic), the weather application will generate the notification 368 that asks if the user wants to reschedule. In some embodiments, a user can input notifications to be triggered when certain weather conditions are met. For example, a user may request the weather application to generate a notification when the current temperature exceeds a threshold. In another example, the user may request the weather application to generate a notification when the weather is no longer rainy.

In some embodiments, the weather application will use a weather forecast in addition to the generated local weather report. For example, if the user has a picnic scheduled for 11:00 a.m. at a location 366 and the weather application, using the generated local weather report, determines that the weather conditions are not suitable (e.g., rainy) for the scheduled activity, the weather application can use the weather forecast to suggest a different time. In some embodiments, the weather forecast indicates that the non-suitable weather conditions (e.g., rain) will change at 2:00 p.m. The weather application can generate the notification 368 to ask if the user wants to reschedule the event and provides a recommended time (e.g., 2:00 p.m.) to reschedule using the weather forecast.

Figure 4:
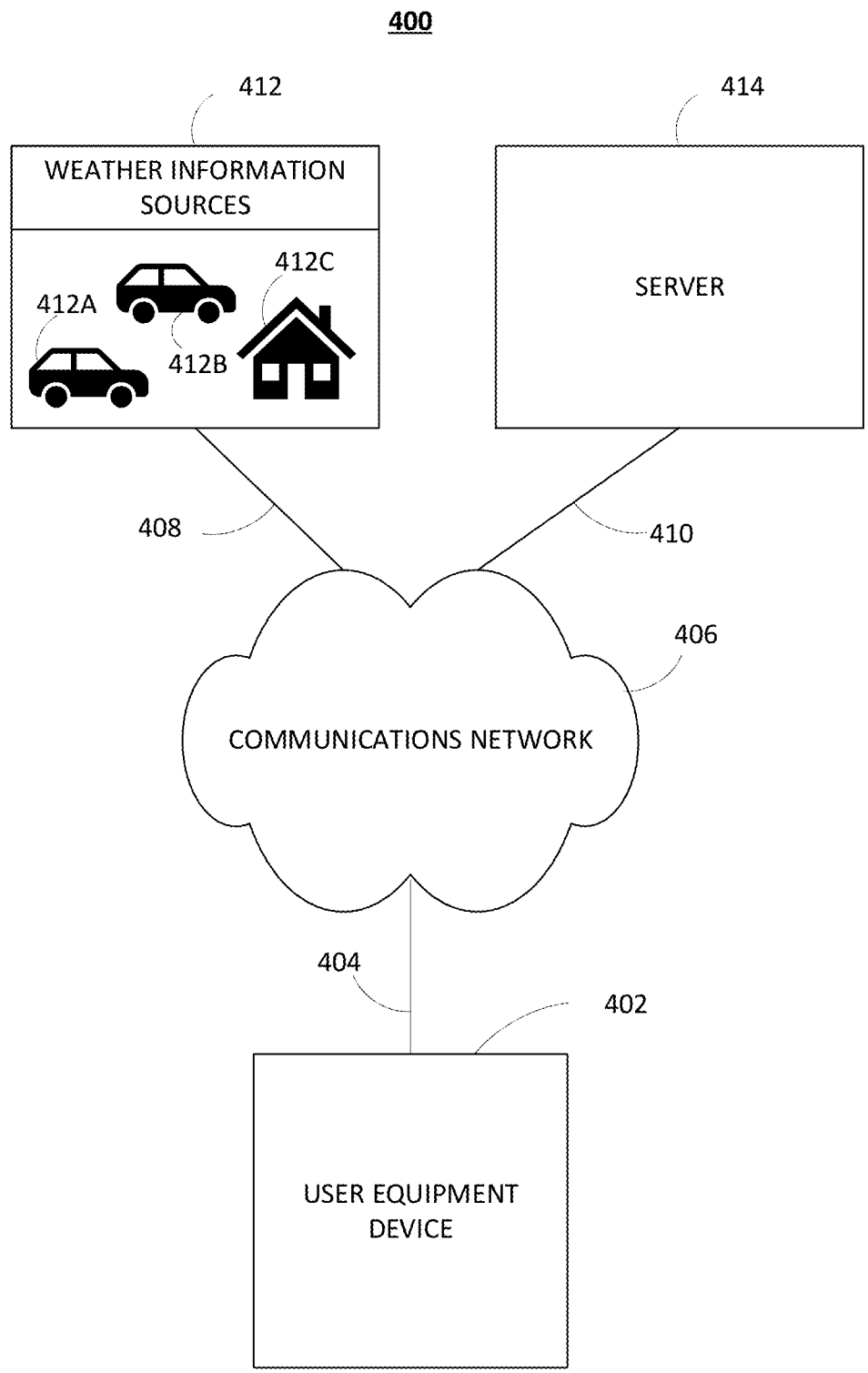
FIG. 4 shows an illustrative block diagram of a system for generating weather reports, in accordance with some embodiments of the disclosure.
Figure 5:
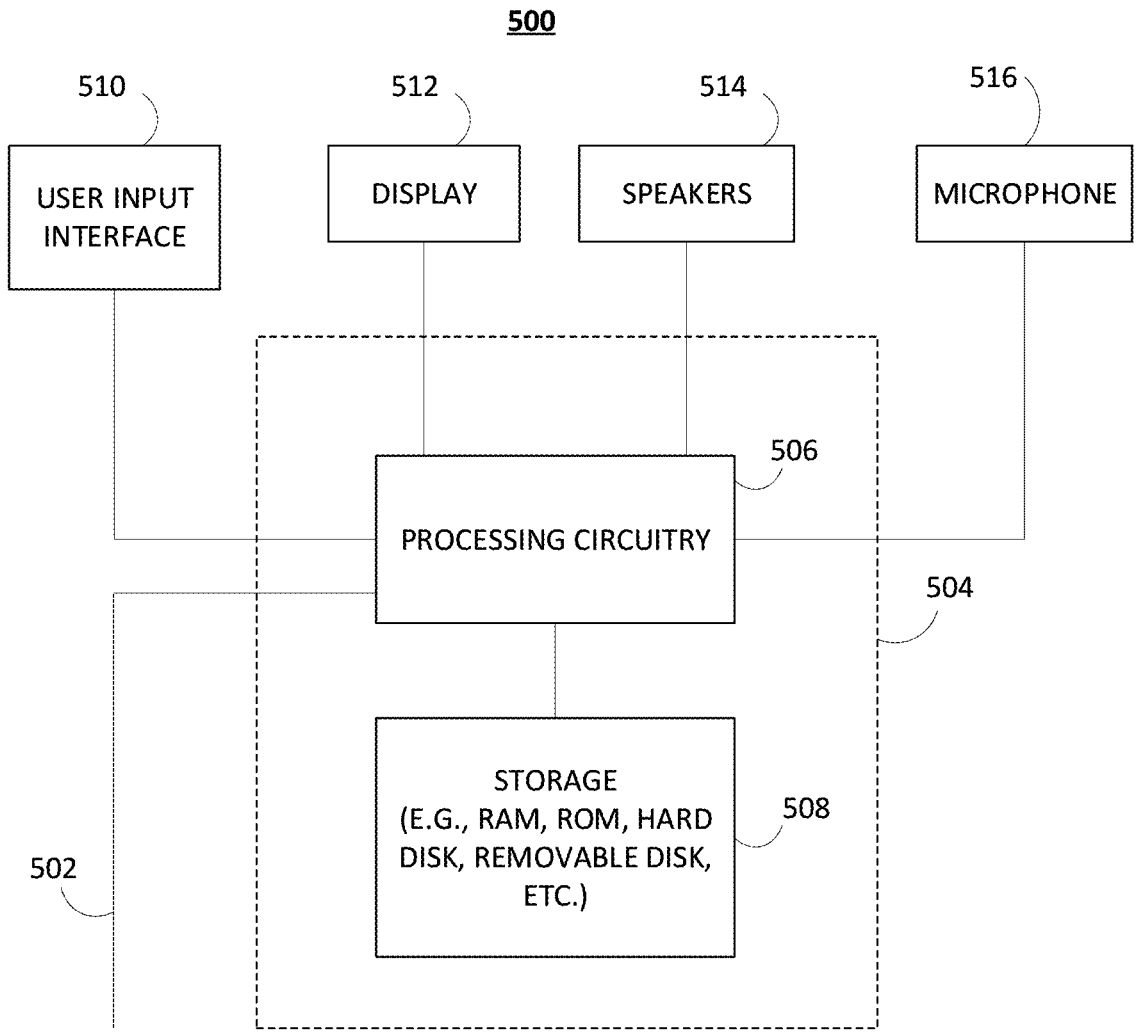
FIG. 5 shows an illustrative block diagram of a user equipment (UE) device system, in accordance with some embodiments of the disclosure.

FIGS. 4-5 describe exemplary devices, systems, servers, and related hardware for providing localized weather information, in accordance with one embodiment. In the system 400, there can be more than one user equipment device 402 but only one is shown in FIG. 4 to avoid overcomplicating the drawing. In addition, a user may utilize more than one type of user equipment device and more than one of each type of user equipment device. In an embodiment there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In an embodiment, the user equipment devices may also communicate with each other directly through an indirect path via the communications network 406.

The user equipment devices may be coupled to communications network 406. Namely, the user equipment device 402 is coupled to the communications network 406 via communications path 404. The communications network 406 may be one or more networks including the Internet, a mobile phone network, mobile voice or data network (e.g., a 4G, 5G, or LTE network), cable network, public switched telephone network, or other types of communications network or combinations of communications networks. The path 404 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment path 404 can be a wireless path. Communication with the user equipment device may be provided by one or more communications paths but is shown as a single path in FIG. 4 to avoid overcomplicating the drawing.

The system 400 also includes weather information sources 412, and server 414, which can be coupled to any number of databases providing information to the user equipment devices. The weather information sources 412 represent any computer-accessible sources of weather information, such as weather-measuring devices, storage for weather information, or, similar such information. The server 414 may store and execute various software modules for providing localized weather information functionality. In some embodiments, the user equipment device 402, weather information sources 412, and server 414 may store metadata associated with weather information and/or weather information requests.

FIG. 5 shows a generalized embodiment of a user equipment device 500, in accordance with one embodiment. In an embodiment, the user equipment device 500, is the same user equipment device 402 of FIG. 4. The user equipment device 500 may receive content and data via input/output (I/O) path 502. The I/O path 502 may provide audio content (e.g., broadcast programming, on-demand programming, Internet content, content available over a local area network (LAN) or wide area network (WAN), and/or other content) and data to control circuitry 504, which includes processing circuitry 506 and a storage 508. The control circuitry 504 may be used to send and receive commands, requests, and other suitable data using the I/O path 502. The I/O path 502 may connect the control circuitry 504 (and specifically the processing circuitry 506) to one or more communications paths. I/O functions may be provided by one or more of these communications paths but are shown as a single path in FIG. 5 to avoid overcomplicating the drawing.

The control circuitry 504 may be based on any suitable processing circuitry such as the processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The providing of weather information functionality can be at least partially implemented using the control circuitry 504. The providing of weather information functionality described herein may be implemented in or supported by any suitable software, hardware, or combination thereof. The providing of weather information can be implemented on user equipment, on remote servers, or across both.

In client-server-based embodiments, the control circuitry 504 may include communications circuitry suitable for communicating with one or more servers that may at least implement the described providing of localized weather information. The instructions for carrying out the above-mentioned functionality may be stored on the one or more servers. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 508 that is part of the control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum storage devices, gaming consoles, gaming media, or any other suitable fixed or removable storage devices, and/or any combination of the same. The storage 508 may be used to store various types of content described herein. Nonvolatile memory may also be used (e.g., to launch a boot-up routine and other instructions). Cloud-based storage, described in relation to FIG. 4, may be used to supplement the storage 508 or instead of the storage 508.

The control circuitry 504 may include audio generating circuitry and tuning circuitry, such as one or more analog tuners, audio generation circuitry, filters or any other suitable tuning or audio circuits or combinations of such circuits. The control circuitry 504 may also include scaler circuitry for upconverting and down converting content into the preferred output format of the user equipment device 500. The control circuitry 504 may also include digital-to-analog converter circuitry and analog-to-digital converter circuitry for converting between digital and analog signals. The tuning and encoding circuitry may be used by the user equipment device 500 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 508 is provided as a separate device from the user equipment device 500, the tuning and encoding circuitry (including multiple tuners) may be associated with the storage 508.

The user may utter instructions to the control circuitry 504, which are received by the microphone 516. The microphone 516 may be any microphone (or microphones) capable of detecting human speech. The microphone 516 is connected to the processing circuitry 506 to transmit detected voice commands and other speech thereto for processing. In some embodiments, voice assistants (e.g., Siri, Alexa, Google Home and similar such voice assistants) receive and process the voice commands and other speech.

The user equipment device 500 may optionally include an interface 510. The interface 510 may be any suitable user interface, such as a remote control, mouse, trackball, keypad, keyboard, touch screen, touchpad, stylus input, joystick, or other user input interfaces. A display 512 may be provided as a stand-alone device or integrated with other elements of the user equipment device 500. For example, the display 512 may be a touchscreen or touch-sensitive display. In such circumstances, the interface 510 may be integrated with or combined with the microphone 516. When the interface 510 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 510 may be HDTV-capable. In some embodiments, the display 512 may be a 3D display. The speaker (or speakers) 514 may be provided as integrated with other elements of user equipment device 500 or may be a stand-alone unit. In some embodiments, the display 512 may be outputted through speaker 514.

The user equipment device 500 of FIG. 5 can be implemented in system 400 of FIG. 4 as user equipment device 402, but any other type of user equipment suitable for providing localized weather information may be used. For example, user equipment devices such as television equipment, computer equipment, wireless user communication devices, or similar such devices may be used. User equipment devices may be part of a network of devices. Various network configurations of devices may be implemented and are discussed in more detail below.

Figure 6:
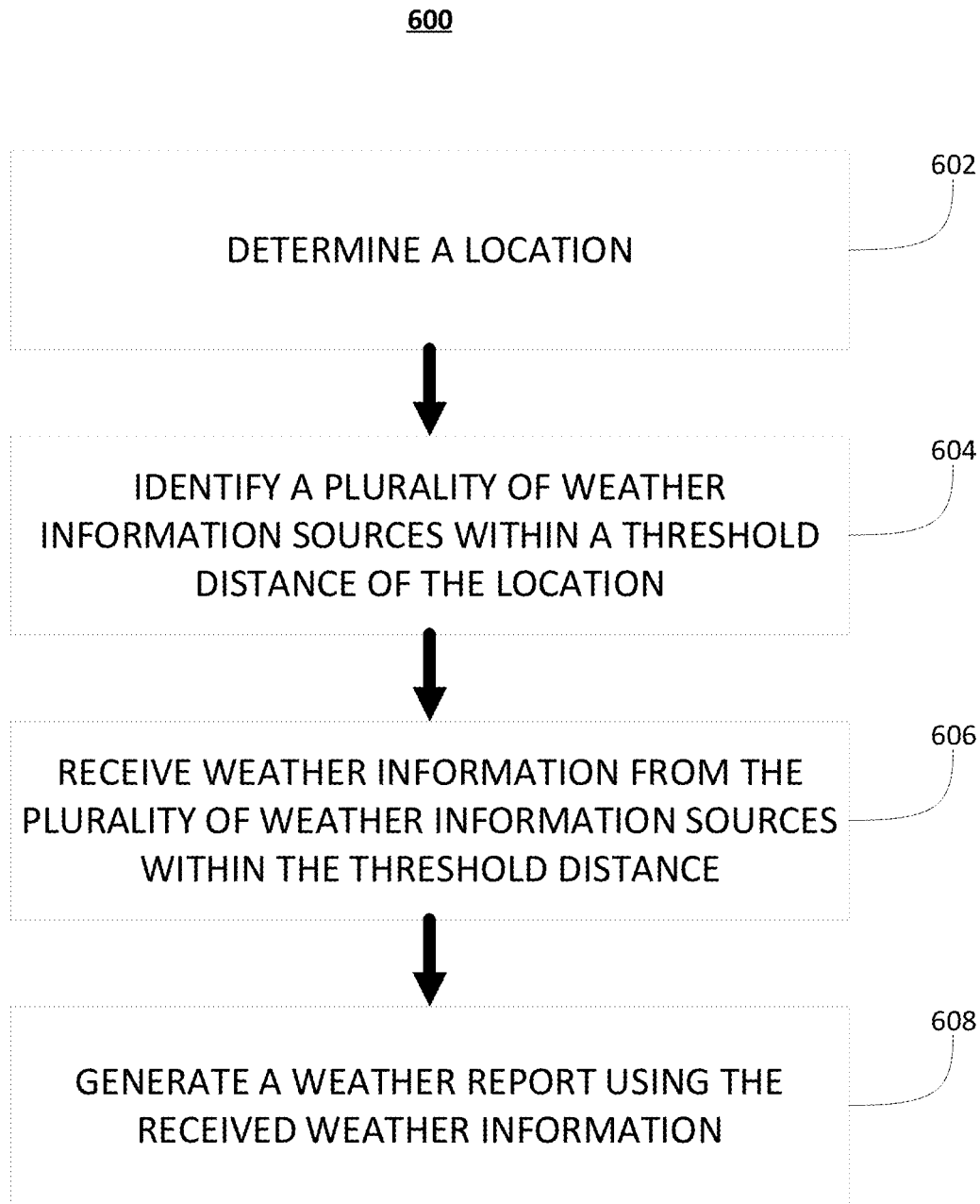
FIG. 6 is an illustrative flowchart of a process for providing localized weather information, in accordance with some embodiments of the disclosure.

FIG. 6 is an illustrative flowchart of a process 600 for providing localized weather information, in accordance with some embodiments of the disclosure. Process 600, and any of the following processes, may be executed by control circuitry 504 on a user equipment device 500. In some embodiments, control circuitry 504 may be part of a remote server separated from the user equipment device 500 by way of a communications network or distributed over a combination of both. In some embodiments, instructions for executing process 600 may be encoded onto a non-transitory storage medium (e.g., the storage 508) as a set of instructions to be decoded and executed by processing circuitry (e.g., the processing circuitry 506). Processing circuitry may, in turn, provide instructions to other sub-circuits contained within control circuitry 504, such as the encoding, decoding, encrypting, decrypting, scaling, analog/digital conversion circuitry, and the like. It should be noted that any of the process, or any step thereof, could be performed on, or provided by, any of the devices shown in FIGS. 1-5. Although the processes are illustrated and described as a sequence of steps, it is contemplated that various embodiments of the processes may be performed in any order or combination and need not include all the illustrated steps.

At 602, the user equipment device 500, by control circuitry 504, determines a location that is used to generate a weather report. In some embodiments, the location is the location of the user equipment device 500. The location of the user equipment device 500 can be determined using a global positioning system, cell tower data, Wi-Fi hotspot information, user profile information, or similar such information. In some embodiments, a location is inputted by a user, where the inputted location is different than the current location of the user equipment device. For example, a user in Los Angeles can select the location "1234 Fifth Ave NE, Seattle Wash.," and the user equipment device 500 displays the weather report corresponding to that location. In some embodiments, the user equipment device 500 provides selectable locations. In some embodiments, the user equipment device 500 infers a location based on user behavior and/or information in a database.

At 604, the user equipment device 500, by control circuitry 504, identifies a plurality of weather information sources within a threshold distance of the location determined in step 602. In some embodiments, when determining vehicles that are within a threshold distance of the location, the user equipment device 500 first determines the threshold distance. In some embodiments, the user equipment device 500 uses a standard threshold distance (e.g., within one mile from the location) for identifying a plurality of weather information sources. To identify the weather information sources within the threshold distance, the user equipment device 500 can access a database containing locations of weather information sources and select weather information sources that are within a threshold distance of the determined location. In some embodiments, the user equipment device 500 submits the determined location to a database and the database determines a threshold distance and identifies weather information sources within the threshold distance.

In some embodiments, the user equipment device 500 determines the threshold distance based on the number of weather information sources required to generate a weather report. For example, the user equipment device 500 may require weather information from at least five weather information sources within the threshold distance to generate a weather report. If a first threshold distance (e.g., within one mile from the location) is used and the user equipment device 500 determines that there are only three vehicles within the one-mile threshold distance, then the user equipment device 500 will incrementally update the threshold distance until a minimum number of vehicles are within the threshold distance. For example, the user equipment device 500 increases the threshold distance from one mile to two miles and determines that eight vehicles are located within the new threshold distance. The user equipment device 500 uses the new threshold distance of two miles because the two-mile threshold distance comprises the necessary number of weather information sources.

At 606, the user equipment device 500, by control circuitry 504, receives weather information from the plurality of weather information sources. In some embodiments, the user equipment device 500 receives weather information (e.g., a plurality of data points) from each of the weather information sources identified in step 604. For example, each weather information source within the threshold distance submits weather information to the user equipment device 500. In some embodiments, each weather information source within the threshold distance submits weather information to a database, and the user equipment device 500 receives weather information from the weather information sources using the database. In some embodiments, the weather information sources submit weather information when requested or may automatically submit weather information periodically (e.g., every 30 seconds).

At 608, the user equipment device 500, by control circuitry 504, generates a weather report using the weather information received in step 606. In some embodiments, the weather information includes a plurality of data points, where the data points correspond to weather information collected by the weather information sources using one or more instruments. For example, a first weather information source within the threshold distance may send a first data point that indicates the temperature determined by the thermometer onboard the weather information source. In some embodiments, data points may correspond to brightness determined by a photoelectric sensor onboard a weather information source and/or precipitation determined by one or more sensors onboard a weather information source. Data points can correspond to any information related to weather conditions such as temperatures, humidity, cloud cover, precipitation, wind speed, barometric pressure, and similar such information.

In some embodiments, when generating the weather report the user equipment device 500 uses weighted averages where each data point is weighted depending on a number of factors. For example, data points received from weather information sources that are closer to the user will be weighted higher than data points received from weather information sources that are farther away from the user. In some embodiments, the user equipment device 500 identifies abnormalities in the data received from the weather information sources before generating the weather report. In some embodiments, data received from the weather information sources may go through smoothing operations (e.g., moving averages, splines, etc.) to correct for variance. In some embodiments, after generating one or more weather reports, the user equipment device 500 can determine weather trends and weather regions (e.g., isothermal lines). The user equipment device 500 can use the weather trends and weather regions to generate more accurate weather reports in the future. In some embodiments, the user equipment device 500 determines that weather trends and weather regions depend on time of day, time of year, and/or similar such temporal categories. In some embodiments, the one or more weather reports may be used in and/or generated by fleet management systems.

In some embodiments, the user equipment device 500 displays the weather report for the user. In some embodiments, displaying the weather report to the user is done visually and/or audibly. In some embodiments, the user equipment device 500 uses the weather report to generate one or more notifications for the user. For example, if the user has a picnic scheduled in their calendar at the determined location and the user equipment device 500 determines, using the weather report, that the weather conditions are not suitable for the scheduled activity, the user equipment device 500 will generate a notification suggesting that the user reschedule the event. In another example, the user equipment device 500 determines, using the weather report, that the weather conditions are rainy and generates a notification to the user recommending the user to bring an umbrella.

Figure 7:
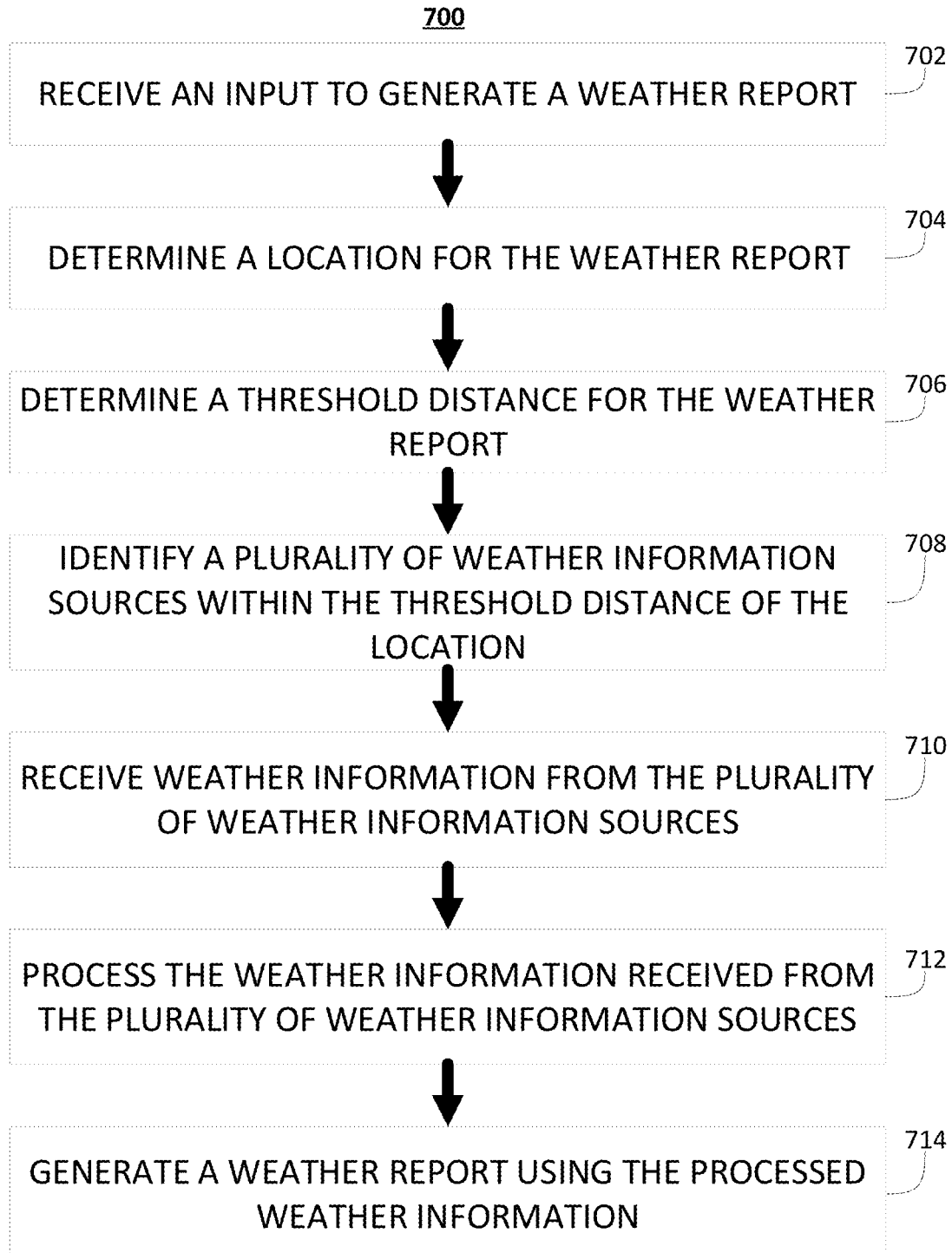
FIG. 7 is an illustrative flowchart of a process for providing localized weather information, in accordance with some embodiments of the disclosure.

FIG. 7 is an illustrative flowchart of a process 700 for providing localized weather information, in accordance with some embodiments of the disclosure.

At 702, the user equipment device 500, by control circuitry 504, receives an input to generate a weather report. In some embodiments, a user generates an input when the user selects an application on the user equipment device 500. In some embodiments, a user generates an input when a user inputs a search. For example, a user may input "find a nearby beach where it is sunny, but the temperature is below 85 degrees," and the user equipment device 500 generates weather reports and determines which weather report correlates to the user's input. In some embodiments, the input is generated in response to a scheduled event. For example, if the user has an event scheduled for 2:00 p.m. the user equipment device 500 receives an input to generate a weather report at 2:00 p.m. In another example, user equipment device 500 receives an input to generate a weather report at some predetermined time (e.g., 30 minutes) before the scheduled event. In some embodiments, the user equipment device 500 predicts inputs from users. For example, the user equipment device 500 can access a database and determine that a baseball game is scheduled for 7:00 p.m. and can further determine that many users will request weather reports for the baseball game. The user equipment device 500 can generate a weather report for the location of the baseball game before any user requests a weather report. In some embodiments, an input is generated periodically. For example, the user equipment device 500 may receive an input to generate a weather report every hour.

At 704, the user equipment device 500, by control circuitry 504, determines a location for the weather report. In some embodiments, the location is the location of the user equipment device 500. The location of the user equipment device 500 can be determined using a global positioning system, cell tower data, Wi-Fi hotspot information, user profile information, or similar such information. In some embodiments, the location is a location inputted by a user, where the inputted location is different than the current location of the user. In some embodiments, the user equipment device 500 provides selectable locations. In some embodiments, the user equipment device 500 infers a location based on user behavior and/or information in a database.

At 706, the user equipment device 500, by control circuitry 504, determines a threshold distance for the weather report. In some embodiments, the user equipment device 500 uses a standard threshold distance (e.g., within one mile from the location). In some embodiments, the user equipment device 500 determines the threshold distance based on the number of weather information sources in an area. In some embodiments, the user equipment device 500 submits the determined location to a database and the database determines a threshold distance. In some embodiments, the user equipment device 500 determines the threshold distance based on the number of weather information sources required to generate a weather report. For example, the user equipment device 500 may require weather information from at least five weather information sources within the threshold distance to generate a weather report. If a first threshold distance (e.g., within one mile from the location) is used and the user equipment device 500 determines that there are only three vehicles within the one-mile threshold distance, then the user equipment device 500 will incrementally update the threshold distance until a minimum number of vehicles are within the threshold distance. For example, the user equipment device 500 increases the threshold distance to two miles and determines that eight vehicles are located within the new threshold distance. The user equipment device 500 uses the new threshold distance of two miles because the two-mile threshold distance comprises the necessary number of weather information sources.

At 708, the user equipment device 500, by control circuitry 504, identifies a plurality of weather information sources within the threshold distance determined in step 706. To identify the weather information sources within the threshold distance, the user equipment device 500 can access a database containing locations of weather information sources and select weather information sources that are within the threshold distance of the location. In some embodiments, the user equipment device 500 submits the determined location and the determined threshold distance to a database and the database identifies weather information sources within the threshold distance.

At 710, the user equipment device 500, by control circuitry 504, receives weather information from the plurality of weather information sources. In some embodiments, the user equipment device 500 receives weather information from each of the weather information sources identified in step 708. For example, each weather information source within the threshold distance submits weather information to the user equipment device 500. In some embodiments, each weather information source within the threshold distance submits weather information to a database, and the user equipment device 500 receives weather information from the weather information sources using the database. In some embodiments, the weather information sources submit weather information when requested or may automatically submit weather information periodically (e.g., every 30 seconds).

At 712, the user equipment device 500, by control circuitry 504, processes the weather information received from the weather information sources in step 710. In some embodiments, the user equipment device 500 translates weather information received from weather information sources into one or more data points. In some embodiments, the user equipment device 500 categorizes the one or more data points. For example, data points related to temperature are categorized as temperature data, while data points relating to precipitation are categorized as precipitation data. In some embodiments, the user equipment device 500 may assign different weights to each data point where the weight depends on a number of factors. For example, data points received from weather information sources that are closer to the location determined in step 704 will be weighted higher than data points received from weather information sources that are farther away from the location determined in step 704. In some embodiments, the user equipment device 500 identifies abnormal data points received from the weather information sources. In some embodiments, data received from the weather information sources goes through smoothing operations (e.g., moving averages, splines, etc.) to correct for variance.

At 714, the user equipment device 500, by control circuitry 504, generates a weather report using the weather information processed in step 712. In some embodiments, when generating the weather report the user equipment device 500 uses the weights assigned to the data points in step 712. In some embodiments, when generating the weather report the user equipment device 500 ignores data points that were identified as abnormal in step 712. In some embodiments, the user equipment device 500 displays the generated weather report for the user. In some embodiments, displaying the weather report to the user is done visually and/or audibly. In some embodiments, the user equipment device 500 generates multiple weather reports for multiple locations where the multiple weather reports are used for searches and/or route planning. For example, if a user has to go to multiple locations (e.g., to make deliveries) then the user equipment device 500 generates multiple weather reports for the multiple locations and recommends an optimal route. In one example, if the weather reports indicate that some of the locations have rain and some of the locations do not have rain, then a device can recommend a route that begins with the locations that do not have rain and leaves the locations with rain for the end, in case the rain stops. In another example, if a user makes temperature-sensitive deliveries (e.g., food, flowers, and/or similar such products) to multiple locations, the user equipment device 500 generates multiple weather reports for the multiple locations and recommends an optimal route.

Figure 8:
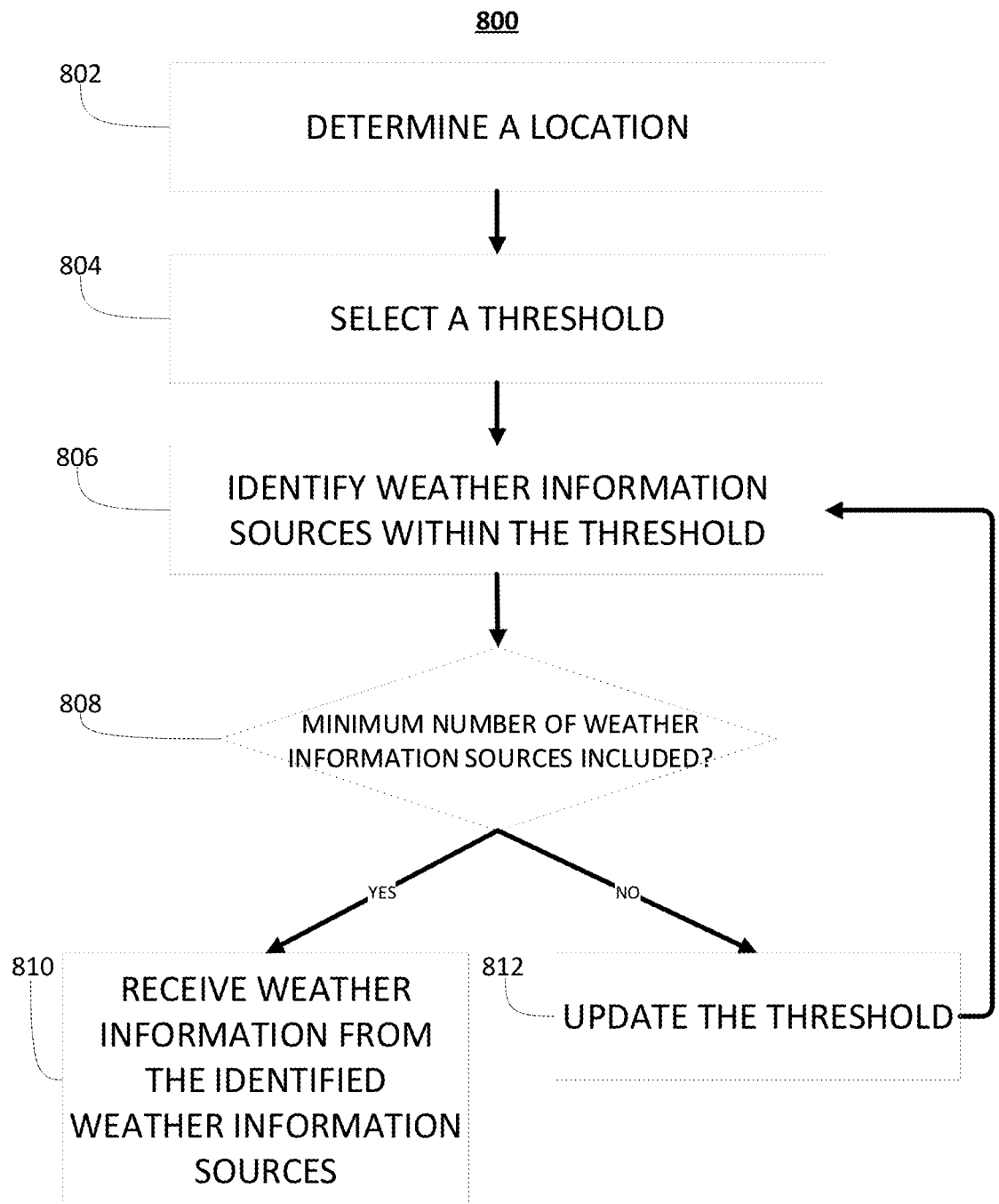
FIG. 8 is an illustrative flowchart of a process for determining a threshold distance when providing localized weather information, in accordance with some embodiments of the disclosure.

FIG. 8 is an illustrative flowchart of a process 800 for determining a threshold distance when providing localized weather information, in accordance with some embodiments of the disclosure.

At 802, the user equipment device 500, by control circuitry 504, determines a location. In some embodiments, the location is the location of the user equipment device 500. The location of the user equipment device 500 can be determined using a global positioning system, cell tower data, Wi-Fi hotspot information, user profile information, or similar such information. In some embodiments, the location is the location inputted by a user, where the inputted location is different than the current location of the user. In some embodiments, the user equipment device 500 provides selectable locations. In some embodiments, the user equipment device 500 infers a location based on user behavior and/or information in a database.

At 804, the user equipment device 500, by control circuitry 504, selects a threshold. In some embodiments, the user equipment device 500 uses a standard threshold distance (e.g., within one mile from the location). A threshold distance or threshold can be any shape, pattern, and/or zone used to categories weather information sources. In some embodiments, the threshold distance is based on a number of factors.

In some embodiments, the determined location is a factor affecting the threshold distance. For example, in populated areas, the starting threshold distance is smaller than in rural areas, because there are more weather information sources in populated areas compared to rural areas. In some embodiments, the climate of the determined location is a factor affecting the threshold distance. For example, some locations are known to have microclimates where weather can vary dramatically between two sublocations despite the two sublocations being relatively close to each other. In this example, the starting threshold distance will be smaller in a location with microclimates because increased granularity is required. In another example, locations with weather affecting driving conditions will have a larger starting threshold distance because fewer vehicles will be on the road. The larger starting threshold distance helps ensure there is enough data to generate an accurate weather report.

In some embodiments, the time of day, season, and/or year are factors affecting the threshold distance. For example, some locations have increased microclimates depending on the time of day, season, and/or year. In some embodiments, the number of weather information sources is affected by the time of day, season, and/or year. For example, during rush hour there may be more vehicles on the road in a given location, so the starting threshold distance can be smaller because there is plenty of data from the weather information sources (e.g., vehicles). In some embodiments, fewer people drive in a given location during night hours so there are fewer weather information sources. Accordingly, the starting threshold distance must be larger to ensure there is enough data to generate an accurate weather report.

In some embodiments, user conditions are a factor affecting the threshold distance. For example, if the user equipment device 500 determines that the user is moving, then the starting threshold will be larger compared to if the user is stationary. A user driving in a car may require a larger starting threshold because a hyper granular weather report will not be helpful to the user. For example, a weather report indicating the weather conditions within one mile of a user is unnecessary if the user is driving seventy miles per hour on the freeway. In some embodiments, the user equipment device 500 determines the direction the user is moving to refine the weather report. For example, after determining that the user is moving north, the user equipment device 500 determines the starting threshold distance to only include areas to the north of the user.

At 806, the user equipment device 500, by control circuitry 504, identifies weather information sources within the threshold distance. To identify the weather information sources within the threshold distance, the user equipment device 500 can access a database containing locations of weather information sources and select weather information sources that are within the threshold distance of the location.

In some embodiments, the user equipment device 500 submits the determined location and the determined threshold distance to a database, and the database identifies weather information sources within the threshold distance.

At 808, the user equipment device 500, by control circuitry 504, determines if there are a minimum number of weather information sources within the determined threshold distance. In some embodiments, there is a minimum number (e.g., five) of weather information sources required to generate a weather report. If the user equipment device 500 determines that there are a minimum number of weather information sources, then the process 800 continues to step 810. If the user equipment device 500 determines that there are not the minimum number of weather information sources, then the process continues to step 812. In some embodiments, the user equipment device 500 determines the minimum number of weather information sources using the same or similar factors to the factors affecting threshold distance described above in step 804. For example, the user equipment device 500 can determine that fewer weather information sources are required at nighttime when there are fewer users driving vehicles. In some embodiments, there is no minimum number of weather information sources, and the process 800 continues to step 810.

At 812, the user equipment device 500, by control circuitry 504, updates the threshold determined in step 804. In some embodiments, the user equipment device 500 incrementally updates the threshold distance. For example, if the starting threshold distance is one mile from the determined location, the user equipment device 500 can increase the distance to two miles from the determined location. In some embodiments, the updated threshold distance covers a larger area than the original threshold distance. In some embodiments, the updated threshold distance overlaps with the area covered by the original threshold distance. In some embodiments, the updated threshold distance encompasses the entire area covered by the original threshold distance. In some embodiments, the user equipment device 500 updates the threshold distance based on predetermined zones, incremental increases, or similar such parameters. After the threshold distance is updated, the process 800 proceeds to step 806.

In some embodiments, the user equipment device 500 updates the threshold distance using one or more factors. In some embodiments, a factor is a predefined multiplier, where the area covered by the original threshold distance is multiplied by the multiplier (e.g., doubled, tripled, etc.). In some embodiments, the one or more factors used to determine the updated threshold are similar or the same as the factors affecting the selecting of the original threshold distance as described above in step 804. For example, at rush hour, a user equipment device 500 updates a first threshold distance from a one-mile radius to a two-mile radius. During night hours, the user equipment device 500 will update the first threshold distance from a one-mile radius to a four-mile radius, because there are fewer users driving vehicles so there are fewer weather information sources.

In some embodiments, the user equipment device 500 uses the number of identified weather information sources to update the threshold. For example, if the user equipment device 500 identifies, using a database, that a minimum number of vehicles are located within a second threshold distance, where the second threshold distance is different than the threshold distance determined in step 804, the user equipment device 500 updates the threshold distance to be the second threshold distance. In another example, if the user equipment device 500 identifies very few or zero weather information sources in the original threshold distance, then the user equipment device may 500 increase the first threshold distance from a one-mile radius to a five-mile radius. If the equipment device 500 identifies a significant number (e.g., 95% of the minimum number of weather information sources required to generate a weather report) of weather information sources in the original threshold distance, then the user equipment device may 500 increase the first threshold distance from a one-mile radius to a one and a half-mile radius.

At 810, the user equipment device 500, by control circuitry 504, receives weather information from the identified weather information sources. In some embodiments, the user equipment device 500 receives weather information (e.g., a plurality of data points) from each of the weather information sources identified in step 806. For example, each weather information source within the threshold distance submits weather information to the user equipment device 500. In some embodiments, each weather information source within the threshold distance submits weather information to a database, and the user equipment device 500 receives weather information from the weather information sources using the database. In some embodiments, the weather information sources submit weather information when requested or may automatically submit weather information periodically (e.g., every 30 seconds).

Figure 9:
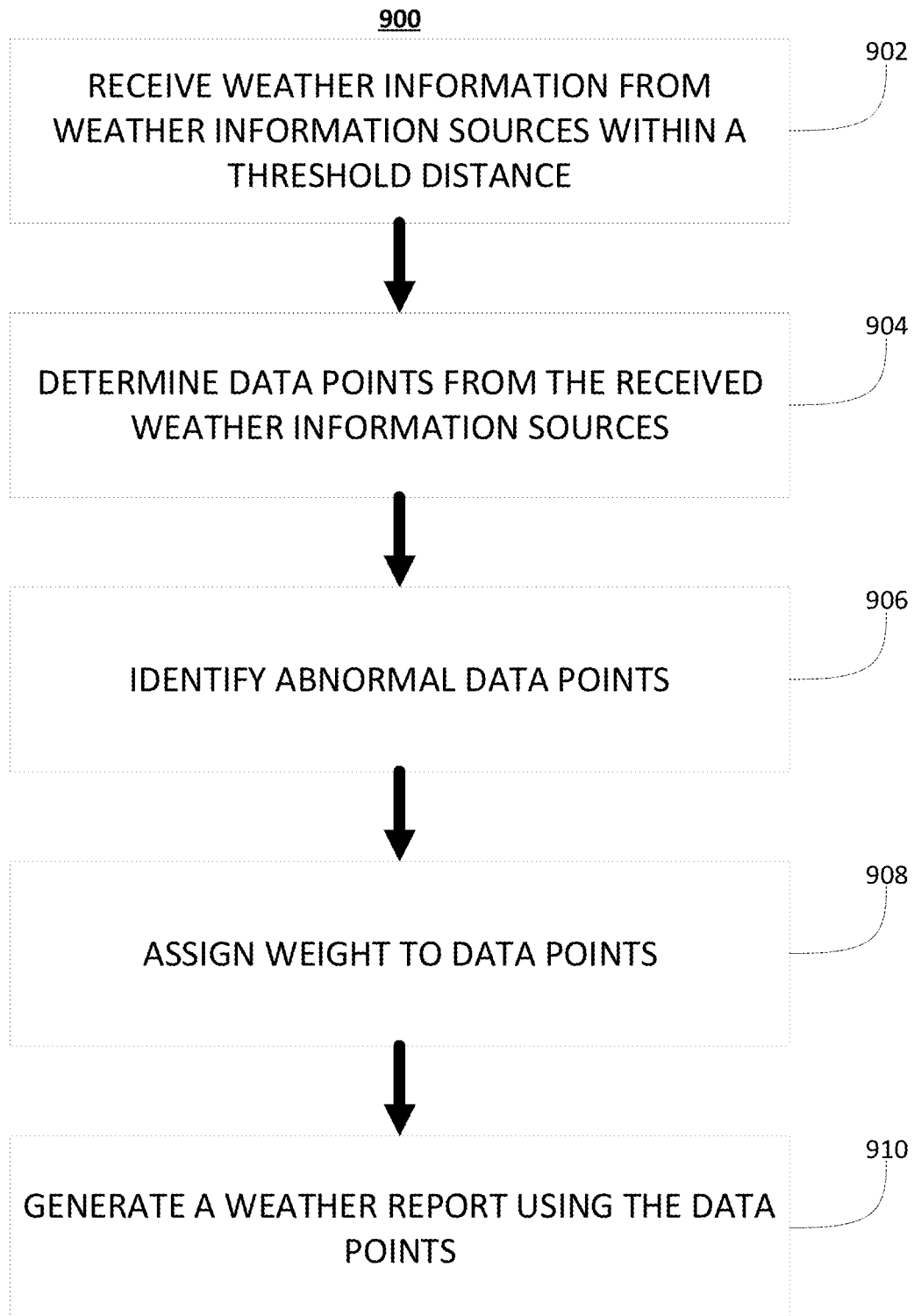
FIG. 9 is an illustrative flowchart of a process for generating a localized weather report, in accordance with some embodiments of the disclosure.

FIG. 9 is an illustrative flowchart of a process 900 for generating a localized weather report, in accordance with some embodiments of the disclosure.

At 902, the user equipment device 500, by control circuitry 504, receives weather information from weather information sources within a threshold distance. In some embodiments, each weather information source within the threshold distance submits weather information to the user equipment device 500. In some embodiments, each weather information source within the threshold distance submits weather information to a database, and the user equipment device 500 receives weather information from the weather information sources using the database. In some embodiments, the weather information sources submit weather information when requested or may automatically submit weather information periodically (e.g., every 30 seconds).

At 904, the user equipment device 500, by control circuitry 504, determines data points from the received weather information. In some embodiments, the user equipment device 500 translates weather information received from the weather information sources into one or more data points. In some embodiments, the user equipment device 500 categorizes the one or more data points. For example, data points related to temperature are categorized as temperature data, while data points relating to precipitation are categorized as precipitation data. In some embodiments, the user equipment device 500 translates different types of data points into a standard format. For example, different weather information stations (e.g., vehicles) may have different formats used for reporting weather information. The user equipment device 500 translates the different types of weather information formats into a standard format, which is used to generate the weather report.

At 906, the user equipment device 500, by control circuitry 504, identifies abnormal data points from the data points determined in step 904. In some embodiments, the user equipment device 500, using data processing methods, determines if any of the data points received from the weather information sources are abnormal. For example, the user equipment device 500 receives five temperature data points from the weather information sources within the threshold distance. Four of the temperature data points are all within an acceptable range of one another (e.g., two degrees) while the fifth temperature data point is more than ten degrees different than any of the other data points. The user equipment device 500 identifies the fifth data point as abnormal. In some embodiments, this abnormality may be the result of the weather information source that submitted the data point being exposed to some variant (e.g., excessive sunlight), faulty instruments, and/or some other irregularity. In some embodiments, the user equipment device 500 does not use data points categorized as abnormal when generating weather reports. In some embodiments, the user equipment device 500 requests the weather information source to submit a new data point and checks if the new data point is within an acceptable range.

In some embodiments, when a weather information source is associated with an abnormal data point, the user equipment device 500 flags the weather information source that submitted the abnormal data point. In some embodiments, data points submitted by a flagged weather information source are not used when generating a weather report. For example, if the flagged weather information source also submits data points for other categories (e.g., precipitation, brightness, etc.) these data points are also flagged as abnormal and are not used when generating a weather report. In some embodiments, data points submitted by a flagged weather information source are weighted differently in step 908. In some embodiments, a flagged weather information source must submit a certain number of non-abnormal data points in order to no longer be flagged as abnormal. In some embodiments, a weather information source that is flagged as abnormal cannot be used to satisfy minimum conditions required to generate a weather report. For example, if the user equipment device 500 requires temperature data points from a minimum of five weather information sources and one of the five information sources is flagged as abnormal, the user equipment device 500 will determine that the minimum conditions to generate the weather report are not met.

At 908, the user equipment device 500, by control circuitry 504, assigns weights to the data points determined in step 904. In some embodiments, to generate the weather report, the user equipment device 500 weights the data points according to one or more factors. In some embodiments, a factor is the proximity of the weather information source to the location associated with the weather report. For example, data submitted by weather information sources closer to the location associated with the weather report are weighted higher than data submitted by weather information sources that are farther away from the location associated with the weather report. In some embodiments, a factor affecting the weighting of data points is the type of weather information source. For example, temperature data submitted by a stationary weather information source is weighted differently than temperature data submitted by a mobile weather information source. In some embodiments, data submitted by newer weather information sources are weighted differently than data submitted by older weather information sources. In some embodiments, data submitted by flagged weather information sources are weighted differently than data submitted by non-flagged weather information sources. In some embodiments, weather information sources have confidence values associated with their submitted weather information. The confidence values may be generated by the weather information source that generates the weather information and/or by the user equipment device 500. In some embodiments, the confidence values are based on the accuracy of previously submitted weather information.

In some embodiments, the user equipment device 500 uses a feedback loop for training and/or calibrating the weighting of data points. For example, the weather report generated at step 910 may indicate that temperature at the location is likely to be 75 degrees. The user equipment device 500 can determine the actual temperature at the location using a trusted weather information source (e.g., the vehicle the user drove to the location). If the user equipment device 500 determines that the actual temperature is higher or lower than 75 degrees, the user equipment device 500 adjusts the weights for either particular weather information sources or locations of weather information sources (e.g., weather information sources to the south are more accurate than weather information sources to the north) used to generate the weather report.

At 910, the user equipment device 500, by control circuitry 504, generates the weather report using the data points weighted in step 908. In some embodiments, when generating the weather report the user equipment device 500 ignores data points that were identified as abnormal in step 906. In some embodiments, the user equipment device 500 uses a weighted average to generate the weather report for the user. In some embodiments, the user equipment device 500 displays the generated weather report for the user. In some embodiments, displaying the weather report to the user is done visually and/or audibly.

It is contemplated that some suitable steps or suitable descriptions of FIGS. 6-9 may be used with other suitable embodiments of this disclosure. In addition, some suitable steps and descriptions described in relation to FIGS. 6-9 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-5 could be used to perform one or more of the steps in FIGS. 6-9.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method for generating a weather report, the method comprising using processing circuitry for:

determining a first location and a second location;

identifying a first plurality of weather information sources within a threshold distance of the first location, wherein one or more of the weather information sources is a mobile weather information source;

identifying a second plurality of weather information sources within a threshold distance of the second location, wherein one or more of the weather information sources of the second plurality of weather information sources is a mobile weather information source;

receiving weather information from the first plurality of weather information sources within the threshold distance of the first location and the second plurality of weather information sources within the threshold distance of the second location;

generating a first weather report for the first location using the weather information received from the first plurality of weather information sources, wherein generating the first weather report for the first location comprises:
  receiving a plurality of data points wherein each data point corresponds to a weather information source of the first plurality of weather information sources;
  assigning a weight to each data point of the plurality of data points; and
  generating the first weather report, wherein the weight assigned to each data point is used to generate the weather report;

generating a second weather report for the second location using the weather information received from the second plurality of weather information sources;

in response to the first weather report and the second weather report, recommending a route by a device, wherein the first location is a first stop on the route and the second location is a second stop on the route;

determining that a sensor associated with the device arrives at the first location;

in response to determining that the sensor arrives at the first location, receiving a measurement from the sensor, wherein the measurement corresponds to an estimated measurement included in the first weather report;

determining that the received measurement is different from the estimated measurement; and in response to determining that the received measurement is different from the estimated measurement, updating a first weight assigned to a first data point of the plurality of datapoints.

2. The method of claim 1, further comprising receiving a command to generate the route, wherein the command indicates the first location and the second location.

3. The method of claim 2, wherein the command is generated due to a scheduled event.

4. The method of claim 1, wherein the first plurality of weather information sources and the second plurality of weather information sources comprise a plurality of thermometers, and the weather information is generated using the plurality of thermometers.

5. The method of claim 1, wherein the weather information comprises brightness data or precipitation data.

6. The method of claim 1, wherein one or more of the first and second plurality of weather information sources is a stationary weather information source.

7. The method of claim 1, wherein the threshold distance of the first location is updated based on the number of the first plurality of weather information sources identified.

8. The method of claim 1, wherein the weight assigned to a second data point of the plurality of data points is based on the distance between a third location corresponding to the weather information source that submitted the second data point and the first location.

9. The method of claim 1, further comprising, transmitting a message indicating that the weather information source that measured a first temperature value corresponding to the first data point requires inspection.

10. The method of claim 1, wherein the sensor was not used to generate the first weather report.

11. The method of claim 1, wherein the first location is recommended as the first stop on the route due to a temperature-sensitive delivery.

12. The method of claim 1, further comprising: generating an updated first weather for report for the first location using updated weather information received from the first plurality of weather information sources, wherein generating the first updated weather report comprises: receiving a second plurality of data points, wherein each data point corresponds to a weather information source of the first plurality of weather information sources; and the second plurality of data points comprise at least one data point associated with the updated first weight assigned to the first data point; generating an updated second weather report for the second location using updated weather information received from the second plurality of weather information sources; and recommending a second route, wherein the first location is the second stop on the updated route and the second location is the first stop on the updated route.

13. An apparatus comprising:
control circuitry; and
at least one memory including computer program code for one or more programs, the at least one memory and the computer program code configured to, with the control circuitry, cause the apparatus to perform at least the following:
  determine a first location and a second location;
  identify a first plurality of weather information sources within a threshold distance of the first location;
  identify a second plurality of weather information sources within a threshold distance of the second location;
  receive weather information from the first plurality of weather information sources within the threshold distance of the first location and the second plurality of weather information sources within the threshold distance of the second location, wherein one or more of the first and second weather information sources is a mobile weather information source;
  generate a first weather report for the first location using the weather information received from the first plurality of weather information sources, wherein the apparatus is further caused, when generating the first weather report to:
    receive a plurality of data points wherein each data point corresponds to a weather information source of the first plurality of weather information sources;
    assign a weight to each data point of the plurality of data points; and
    generate the first weather report, wherein the weight assigned to each data point is used to generate the weather report;
  generate a second weather report for the second location using the weather information received from the second plurality of weather information sources;
  in response to the first weather report and the second weather report, recommend a route, wherein the first location is a first stop on the route and the second location is a second stop on the route;

determine that a sensor associated with the apparatus arrives at the first location;

in response to determining that the sensor arrives at the first location, receive a measurement from the sensor, wherein the measurement corresponds to an estimated measurement included in the first weather report;

determine that the received measurement is different from the estimated measurement; and in response to determining that the received measurement is different from the estimated measurement, update a first weight assigned to a first data point of the plurality of datapoints.

14. The apparatus of claim 13, wherein the first plurality of weather information sources and the second plurality of weather information sources comprise a plurality of thermometers, and the weather information is generated using the plurality of thermometers.

15. A non-transitory computer-readable medium having instructions encoded thereon that, when executed by control circuitry, cause the control circuitry to:

determine a first location and a second location;

identify a first plurality of weather information sources within a threshold distance of the first location;

identify a second plurality of weather information sources within a threshold distance of the second location;

receive weather information from the first plurality of weather information sources within the threshold distance of the first location and the second plurality of weather information sources within the threshold distance of the second location, wherein one or more of the first and second weather information sources is a mobile weather information source;

generate a first weather report for the first location using the weather information received from the first plurality of weather information sources, wherein the control circuitry is further caused, when generating the first weather report to:

receive a plurality of data points wherein each data point corresponds to a weather information source of the first plurality of weather information sources;

assign a weight to each data point of the plurality of data points; and generate the first weather report, wherein the weight assigned to each data point is used to generate the weather report;

generate a second weather report for the second location using the weather information received from the second plurality of weather information sources;

in response to the first weather report and the second weather report, recommend a route, wherein the first location is a first stop on the route and the second location is a second stop on the route;

determine that a sensor associated with the control circuitry arrives at the first location;

in response to determining that the sensor arrives at the first location, receive a measurement from the sensor, wherein the measurement corresponds to an estimated measurement included in the first weather report;

determine that the received measurement is different from the estimated measurement; and in response to determining that the received measurement is different from the estimated measurement, update a first weight assigned to a first data point of the plurality of datapoints.

16. The non-transitory computer-readable medium of claim 15, wherein the first plurality of weather information sources and the second plurality of weather information sources comprise a plurality of thermometers, and the weather information is generated using the plurality of thermometers.

* * * * *